UNITED STATES PATENT OFFICE.

BARTHOLOMEW J. COUHIG, OF YOUNGSTOWN, OHIO.

WOOD-FILLER.

SPECIFICATION forming part of Letters Patent No. 432,118, dated July 15, 1890.

Application filed August 2, 1889. Serial No. 319,556. (No specimens.)

*To all whom it may concern:*

Be it known that I, BARTHOLOMEW J. COU-HIG, a citizen of the United States, residing at Youngstown, in the county of Mahoning and State of Ohio, have invented a new and useful Composition of Matter of Value in the Painter's Art as a Hard-Wood Filler, of which the following is a specification.

My hard-wood filler consists of the following ingredients, combined in the proportions stated—viz., molasses, one gallon; pure water, three gallons; corn-starch, four pounds; pulverized gypsum, four pounds; glue, eight ounces; alcohol, three pints. These ingredients are mixed in the following manner: The starch is mixed with about one-half of the water and agitated until all lumps disappear. The molasses is mixed with the remainder of the water. The two mixtures are then poured together and the pulverized gypsum is stirred into the combination. The glue, first powdered, is then similarly added, whereupon the compound is thoroughly agitated to more completely amalgamate the ingredients, during which process the alcohol is added also. The result is a compound of about the consistency of ordinary cream, that is a superior substitute for an oil-filler and is an excellent distemper hard-wood filler or filler-size.

I do not limit myself either to the exact proportions given above of the ingredients or to the method of mixing above given, as I have found by a series of experiments that both may be greatly varied. I have found also that while the ingredients as above given are preferable there are for each, except the water, several equivalents for the purpose, that may be used when more convenient, among which I name the following: For molasses use glucose, sirup, honey, sugar; for the glue, gum-arabic; for the corn-starch, any starch; for the pulverized gypsum, whiting, Spanish white, Paris white. When color is desired, any of the stains may be used.

What I claim is—

The herein-described composition of matter for a hard-wood filler, consisting of molasses, water, starch, pulverized gypsum, glue, and alcohol, or their equivalents, mixed in substantially the proportions specified.

BARTHOLOMEW J. COUHIG.

Witnesses:
HORACE SMITH,
MOLLIE GRAHAM.